United States Patent [19]

Duquesne

[11] 4,230,170
[45] Oct. 28, 1980

[54] APPARATUS FOR FITTING AND REMOVING AN AUTOMOBILE TIRE

[76] Inventor: Victor Duquesne, Quellinstraat 42, 2000 Antwerpen, Belgium

[21] Appl. No.: 785,478

[22] Filed: Apr. 7, 1977

[30] Foreign Application Priority Data

Mar. 14, 1977 [BE] Belgium .................................. 255731

[51] Int. Cl.³ .................................................. B60C 25/06
[52] U.S. Cl. .................................................. 157/1.24
[58] Field of Search ...................... 157/1.17, 1.22, 1.24

[56] References Cited

U.S. PATENT DOCUMENTS

| | | | |
|---|---|---|---|
| 3,528,475 | 9/1970 | Duquesne | 157/1.24 |
| 3,791,434 | 2/1974 | Duquesne | 157/1.24 |
| 3,815,653 | 6/1974 | Scott et al. | 157/1.24 |

Primary Examiner—James G. Smith
Attorney, Agent, or Firm—William Drucker

[57] ABSTRACT

The present apparatus is for fitting and removing tires from a wheel of an automobile. This apparatus comprises a driven table which can rotate and upon which the wheel is attached, an upright column and a horizontal arm fitted in said column, a bar provided with a tool for fitting and removing the tire, a carriage which can be moved along the arm and in which the bar with tool is vertically suspended and adjustable in height and a single means to fix simultaneously the carriage upon said arm, to fix the vertical bar in the carriage and to locate said bar at a certain angle, so that the tool of the latter is placed in two directions at a predetermined distance from the attached wheel.

9 Claims, 6 Drawing Figures

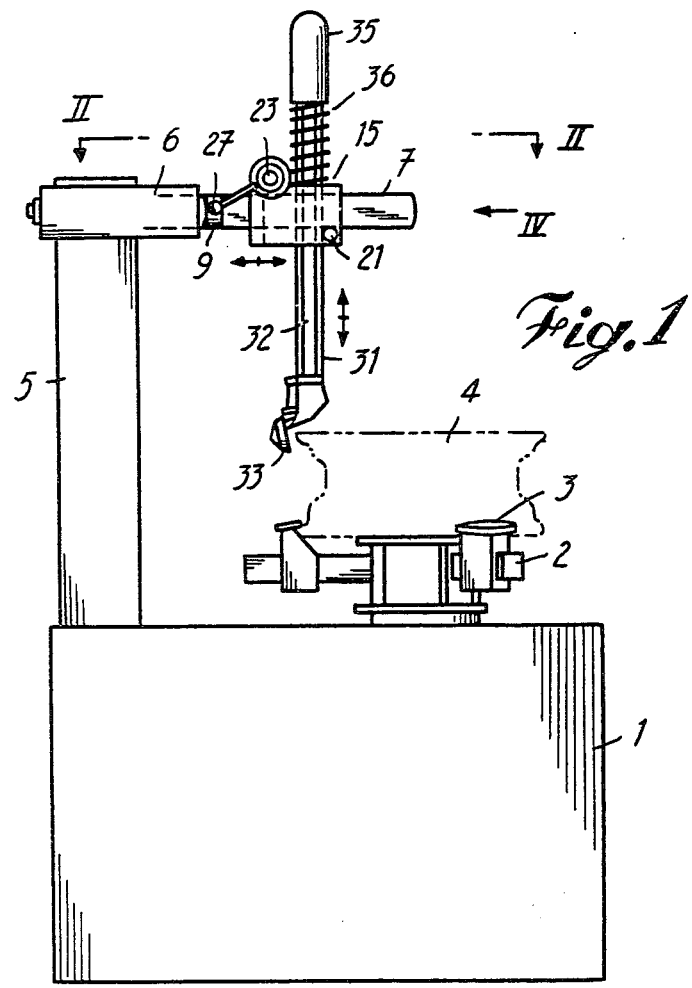
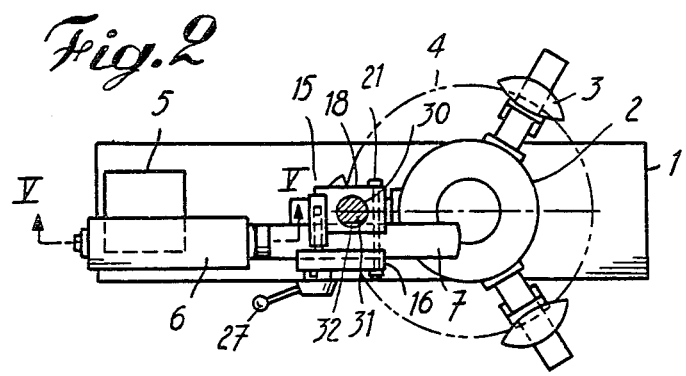

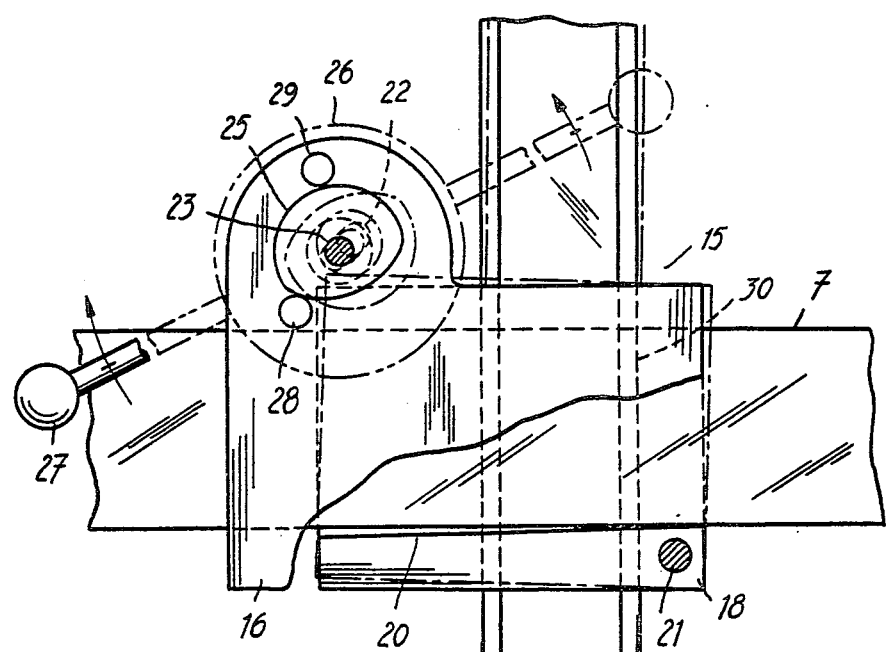
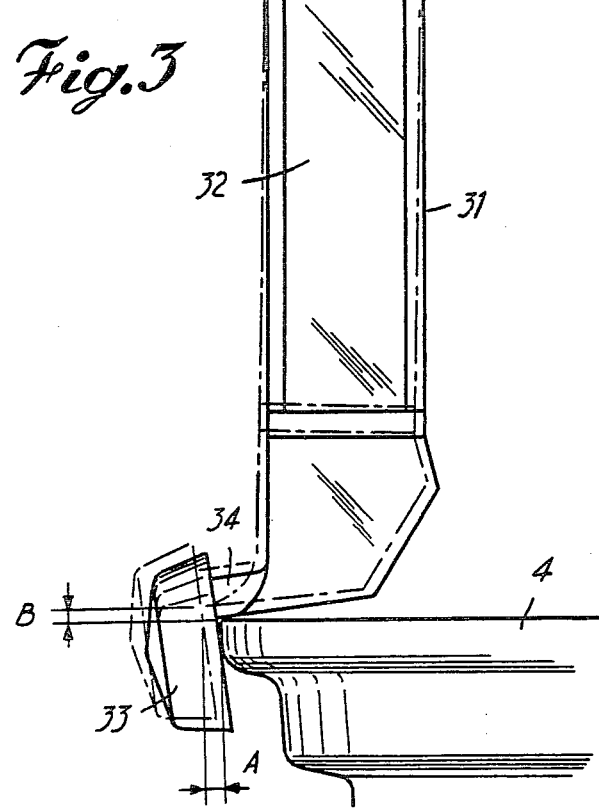
Fig. 3

APPARATUS FOR FITTING AND REMOVING AN AUTOMOBILE TIRE

DESCRIPTION

An apparatus is known made up mainly of a frame, of a table with jaws upon which the wheel can be fixed, of a driving element permitting the radial movement of the jaws and the drive of the table so as to make it rotate, of an upright column mounted upon aforesaid frame, of a horizontal arm fitted in said column and capable of sliding therein and of being fixed, of a bar with a tool used for fitting and removing a tire, said bar being adjustable in height and being fitted vertically at the end of aforesaid horizontal arm.

In order to be able to place the tool in its correct location, with respect to the wheel, the horizontal arm must be moved towards the wheel and the bar with the tool must be adjusted in height, after which these two movements are locked. Besides the fact that two separate means of adjustment are required to adjust the tool, this tool must be located in its correct position by sight and by hand, which takes time and irritates the operator.

According to a main characteristic of the invention, a device has been built to obviate this condition, and mainly consists of a carriage which can move along the horizontal arm and in which the vertical tool carrying bar is suspended, as well as of one single means which permits simultaneously to lock the carriage on aforesaid arm, to fix the bar in the carriage and to adjust aforesaid bar at a certain angle so as to be able to adjust the tool in two directions at a predetermined distance of the fixed wheel.

This device, in which only one handle has to be operated is most efficient, simple and inexpensive to manufacture. Moreover, the apparatus need not be newly adjusted each time, when a series of tires and wheels of the same size have to be handled successively.

Merely as an example and without the slightest intent of limitation, a more detailed description will be given hereinafter of a chosen form of embodiment of the apparatus according to the invention, with reference to the appended drawings in which:

FIG. 1 is a side view of an apparatus for fitting a tire and removing it;

FIG. 2 is a top view of the apparatus;

FIG. 3 is an enlarged side view of the carriage in which the bar with the tool is locked;

Figure 4:
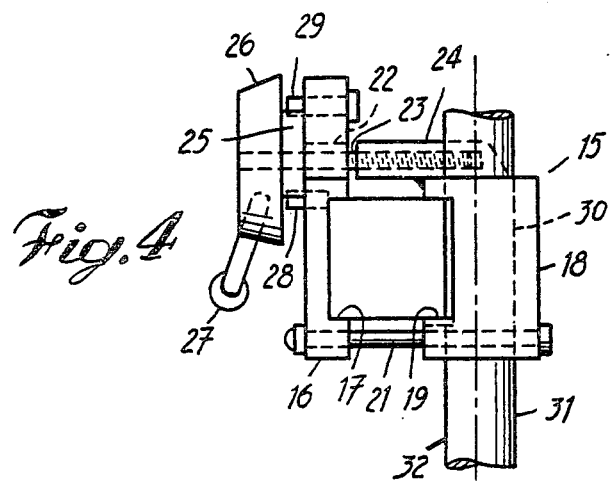
FIG. 4 is an enlarged partial front view according to arrow IV in FIG. 1.
Figure 5:
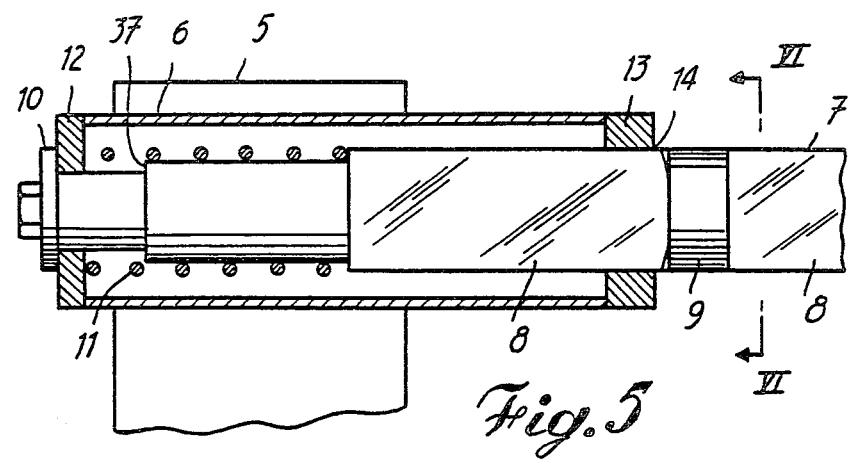
FIG. 5 is an enlarged partial longitudinal section according to line V—V of FIG. 2.
Figure 6:
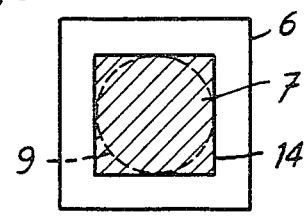
FIG. 6 is a cross-section according to line VI—VI in FIG. 5.

In these figures we notice a casing 1 which houses the driving mechanism of a well known device 2 with jaws 3 for attaching and driving the wheel 4 so as to make it rotate. On casing 1 a column 5 is attached which, at its upper part carries a horizontal box 6 with a square cross-section. In this box there is fitted an arm 7 which can be moved axially. This arm comprizes a part 8 with a square cross-section and a part 9 with circular cross-section, the diameter of which is equal to the width of the faces of arm 7. A stop washer 10 is fitted at the rear of the arm, whereas a compression spring 11 is fitted between arm 7 and the end face 12 of box 6. This arm 7 is consequently stressed so as to protrude from box 6, whereby its movement is limited by stopwasher 10. Similarly, the movement of the arm towards the inside is limited by shoulder 37. In the front, box 6 is closed by a guide ring 13 with square opening 14, into which fits part 8 with square cross-section and in which cylindrical part 9 can rotate. On said arm 7 is fitted a carriage 15, which can be moved and locked in the longitudinal sense of the arm. This carriage is made up of a front sliding block 16 with a hollow 17 which engages the front face of arm 7, and of a rear sliding block 18 with a hollow 19 which engages the rear face of arm 7, but of which the lower bearing surface 20 is on a slight slant towards column 5 (FIG. 3). A shaft 21 connects both blocks 16 and 18 together, whereas only block 18 has the possibility of rotating slightly around this shaft 21 in the manner of a hinge. In front block 16 there is provided a curved and oval opening 22 located on an arc of a circle of which the center coincides with shaft 21. Through this opening there passes a threaded rod 23, which screws in a threaded pull box 24, said box being fixed to rear sliding block 18. At the front, this rod 23 carries a cam 25 and a disc 26 with handle 27, said handle permitting threaded rod 23 to be rotated around its axis. A support post 28, fixed to front block 16, cooperates with cam 25, so as to make rear block 18 rotate around shaft 21 in the manner of a hinge. Similarly, a guide post 29 is fixed to block 16 for the purpose of bringing back block 18 in its horizontal position by means of cam 25, of which the operation will be described in greater detail in the following text. In block 18 is provided a cylindrical opening 30, through which passes a bar 31 with circular cross-section and provided with a longitudinal flat face 32. The location of opening 30 has been chosen in such a manner that flat face 32 is adjoining with arm 7. At the bottom of the bar is fixed the tool for removing and fitting a tire on a wheel. A small pressure roller 33 is part of this tool and is fixed to a support 34 of bar 31. Aforesaid small pressure roller and aforesaid support cooperate with the bead of the tire to be fitted. This bar 31 carries a handle 35 at the top, whereas a compression spring 36 is provided between aforesaid handle and block 18 so as to prevent the bar from falling out of block 18. Bar 31 with the tool for fitting the tire is located in such a manner that the center line of this bar is aligned with the center line of device 2 for fixing the wheel (FIG. 2). The tool consequently is in the ideal location with respect to the wheel.

In order to fit a tire to a wheel, arm 7 is pushed into box 6 until the cylindrical part of arm 7 is located in the square opening 14 of box 6, after which one rotates arm 7 around its center line until bar 31 with the tool is in horizontal position. When releasing arm 7, spring 11 presses arm 7 so as to make it protrude from box 6, up to the limit where stop washer 10 abuts the end face 12 and that square part 8 of arm 7 is again fitted in square opening 14 of box 6. In this manner arm 7 can no longer be rotated and bar 31 is removed from device 2 which is used for fixing the wheel. A wheel is then located between jaws 3 of device 2, which may be of any known type whatever, and the wheel is fixed on the device. A tire is then placed slanting on the wheel in the well known manner and arm 7 is again rotated around its center line in the above described manner but in the opposite sense, and such until bar 31 has again reached its vertical position. Handle 27 and disc 26 are now turned towards the left, in such a manner that the threaded rod 23 comes further out of pull box 24 and that both blocks 16 and 18 are freed with respect to arm 7. Therefore flat face 32 of bar 31 loosens from arm 7 so that said bar 31 can be moved in height within block 18. When rotating handle 27, cam 25 turns at the same time. At a certain moment this cam contacts the fixed guiding post 29, so that as it continues to rotate below aforesaid post, threaded rod 23 moves within oval opening 22, in such a manner that pull box 24 also moves and that rear block 18 rotates towards the bottom around shaft 21 in the manner of a hinge. When handle 27 stops in its rotary movement, cam 25 is jammed between both posts 28 and 29. The device is then in its free position illustrated in full lines in FIG. 3. Bar 31 is then gripped by handle 35, carriage 15 is moved along arm 7 and bar 31 is simultaneously moved in height in block 18 and such until the upper edge of the wheel is in contact with the angle formed by the small pressure roller 33 and the support 34 of bar 31.

When handle 27 is again pivoted towards the right, threaded rods 23 screws into pull box 24 of block 18, so that both blocks 16-18 are pulled towards each other and wedge flat face 32 of bar 31 against arm 7 so that aforesaid bar 31 is clamped tight. By this same movement of handle 27 towards the right, cam 25 rotates freely below post 29, then passes above fixed support post 28, so that the threaded rod 23 is obliged to move upward within oval opening 22. In this manner, pull box 24 of block 18 is driven and moved upward, so that this block 18 rotates upward around shaft 21 in the manner of a hinge and that slanting face 20 of hollow 19 from block 18 is applied against the lower face of arm 7. At the end of the movement of handle 27, the small pressure roller 33 and support 34 automatically locate at the ideal distances A and B of wheel 4, as shown in FIG. 3 in interrupted lines. When the bead of the tire has been located in the well known manner upon support 34 of bar 31, the drive mechanism of device 2 is started, so that the wheel starts rotating and that the tire is perfectly fitted on the wheel, and such without the fitting or removing tool coming into contact with the wheel. When handling a wheel which is not perfectly round, the tool will yield and clear the wheel, and such due to the action of spring 11 which cooperates with arm 7.

It is perfectly obvious, that the shape, the dimensions and the fitting of the abovementioned parts, relative to each other, may differ widely, and that certain parts may even be replaced by others which are used for the same purpose.

I claim:
1. Apparatus, for fitting and removing an automobile tire, comprising:
   (i) a frame
   (ii) a table rotatably mounted on said frame and including jaws radially movable for gripping a wheel
   (iii) means for rotating said table
   (iv) means for radially moving said jaws
   (v) a column extending vertically from said frame
   (vi) a horizontal arm carried by said column and movable horizontally along its own longitudinal axis with respect to said column,
   (vii) a carriage movable along the arm
   (viii) a vertical bar carried by and vertically adjustable with respect to said carriage, said bar being provided with a tool for fitting and removal of a tire, and
   (ix) fixing means acting between the carriage and the arm, and between the vertical bar and the carriage, for simultaneously locking the carriage to the arm and locking the vertical bar to the carriage such that the tool becomes disposed, in two directions, at a predetermined distance from a wheel on said table, said fixing means comprising first and second relatively movable blocks included in said carriage and disposed one at each side of the arm and each defining a longitudinal guide for the arm, the guide defined by one said block being formed to provide a clearance in height of the block with respect to the arm, said one block having a vertical opening receiving the bar in contact with the arm, a shaft connecting the two blocks, and actuating means which serve to simultaneously draw the two blocks together to press the bar against the arm, and to raise said one block with respect to the other block for locking said one block to the arm with the bar in a predetermined position with respect to the arm.

2. Apparatus, as claimed in claim 1, wherein that part of the arm along which the carriage is movable has a square cross-section, and wherein each of the blocks is of C-shaped cross-section, the blocks abutting respective opposite faces of the arm.

3. Apparatus, as claimed in claim 2, wherein the bar has a circular cross-section with a flat face along the length of the bar abutted on a face of the square cross-section of the arm.

4. Apparatus, as claimed in claim 2, wherein the guide defined by said one block is bounded by a lower slanted face to permit the block to pivot about said shaft.

5. Apparatus, as claimed in claim 1, wherein said actuating means comprise:
   (i) a pull box on said one block, said pull box having a threaded bore
   (ii) a threaded rod engaged in said bore and passing through an opening in the other block, the diameter of said opening being greater than that of said threaded rod,
   (iii) a handle on said rod for rotating it
   (iv) an edge cam on said rod
   (v) an abutment on said other block contacting said edge cam,
the arrangement being such that, when the rod is rotated by the handle in the direction to draw the blocks towards each other, the cam acting against the abutment causes said one block carrying the bar to pivot about the shaft, thereby to adjust the tool with respect to the wheel in two directions simultaneously.

6. Apparatus, as claimed in claim 5, wherein said opening through which the threaded rod passes is of a curved oval shape and is located on an arc of a circle having its center coincident with the center of the shaft which connects the two blocks.

7. Apparatus, as claimed in claim 5, further comprising a second abutment on said other block positioned to be abutted by said cam so that, during rotation of said rod to release the blocks, said one block is forced to pivot in the reverse direction.

8. Apparatus, for fitting and removing an automobile tire, comprising:
   (i) a frame
   (ii) a table rotatably mounted on said frame and including jaws radially movable for gripping a wheel
   (iii) means for rotating said table
   (iv) means for radially moving said jaws
   (v) a column extending vertically from said frame
   (vi) a box carried by said column (vii) a horizontal arm slidable horizontally along its own longitudinal axis in said box with respect to said column under the action of resilient loading means acting between the box and the arm (viii) a carriage movable along the arm (ix) a vertical bar carried by and vertically adjustable with respect to said carriage, said bar being provided with a tool for fitting and removal of a tire, and (x) fixing means acting between the carriage and the arm, and between the vertical bar and the carriage for simultaneously locking the carriage to the arm and locking the vertical bar to the carriage, such that the tools becomes disposed, in two directions, at a predetermined distance from a wheel on said table.

9. Apparatus, as claimed in claim 8, wherein said box has an opening of square cross-section, and wherein said arm has a first portion of square cross-section which when engaged in said opening prevents rotation of the arm in the box, and a second portion of round cross-section which when engaged in said opening permits rotation of the arm in the box.

* * * * *